United States Patent
Gaucher et al.

(10) Patent No.: US 10,289,979 B2
(45) Date of Patent: May 14, 2019

(54) GREETING AGENT FOR MEETING INTRODUCTIONS

(71) Applicant: International Business Machines Corporation, Armonk, NY (US)

(72) Inventors: Brian P. Gaucher, Brookfield, CT (US); Dario Gil, Katonah, NY (US); Jonathan Lenchner, North Salem, NY (US); David O.S. Melville, New York, NY (US); Valentina Salapura, Chappaqua, NY (US); Alan M. Webb, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 14/554,376

(22) Filed: Nov. 26, 2014

(65) Prior Publication Data
US 2016/0148156 A1 May 26, 2016

(51) Int. Cl.
G06F 17/30 (2006.01)
G06Q 10/10 (2012.01)
H04L 29/06 (2006.01)
G10L 13/00 (2006.01)

(52) U.S. Cl.
CPC ....... *G06Q 10/10* (2013.01); *G06F 17/30038* (2013.01); *H04L 65/403* (2013.01); *G10L 13/00* (2013.01)

(58) Field of Classification Search
CPC .............................................. G06F 17/30038
See application file for complete search history.

(56) References Cited

U.S. PATENT DOCUMENTS

| | | | |
|---|---|---|---|
| 7,606,772 B2 | 10/2009 | Flinn et al. |
| 7,936,863 B2 | 5/2011 | John et al. |
| 8,015,019 B1 | 9/2011 | Smith et al. |
| 8,180,722 B2 | 5/2012 | John et al. |
| 8,627,210 B2 | 1/2014 | Vijayakumar et al. |

(Continued)

OTHER PUBLICATIONS

"Hangout Apps", Google Developers, pp. 1-3, downloaded on Oct. 3, 2014, <https://developers.google.com/+/hangouts/>.

(Continued)

*Primary Examiner* — Grace Park
*Assistant Examiner* — Kurt A Mueller
(74) *Attorney, Agent, or Firm* — Christopher K. McLane; Maeve L. McCarthy

(57) ABSTRACT

In an approach to determining an introduction of a user in a meeting, one or more computer processors retrieve a document containing information associated with a user, wherein the document includes one or more fragments describing the user. The one or more computer processors determine an audience of a meeting associated with the user. The one or more computer processors determine a description of the meeting. The one or more computer processors prioritize one or more of the one or more fragments, based, at least in part, on the audience of the meeting and on the description of the meeting. The one or more computer processors select one or more of the one or more fragments for the introduction of the user in the meeting, based, at least in part, on the prioritization of the one or more fragments.

17 Claims, 7 Drawing Sheets

350

| Fragment [Default Order top -> bottom] | Relevance for audience that user knows well | Relevance for technical audience | | Relevance for group of superiors | |
|---|---|---|---|---|---|
| 314 — This is what I am striving to do with my career. | 0 | | 0 | | 0 |
| 302 — My most significant accomplishments are X and Y. | 7 | A | 8 | C | 8 | A |
| 304 — 2013 Led Development of Super-duper workflow manager | 6 | B | 9 | A | 7 | C |
| 306 — 2012 Promoted to Senior Architect | 5 | C | 9 | B | 8 | B |
| 308 — 2009 Named official corporate champion of Some Such Agile Development Process | 2 | D | 7 | D | 5 | |
| 310 — 2008 Successfully led development of Some Such Accounting Package | 1 | | 5 | | 5 | D |

316 322 318 324 320 326

(56) References Cited

U.S. PATENT DOCUMENTS

| | | | | |
|---|---|---|---|---|
| 8,700,540 | B1* | 4/2014 | Zambrano | G06Q 50/01 |
| | | | | 705/319 |
| 2002/0169836 | A1* | 11/2002 | Hood | G06Q 30/02 |
| | | | | 709/206 |
| 2003/0158864 | A1* | 8/2003 | Samn | G06Q 10/107 |
| 2006/0067252 | A1 | 3/2006 | John et al. | |
| 2007/0210945 | A1 | 9/2007 | Chu et al. | |
| 2009/0157658 | A1* | 6/2009 | Bonev | G06Q 30/00 |
| 2011/0289422 | A1* | 11/2011 | Spivack | G06Q 10/109 |
| | | | | 715/739 |
| 2012/0203845 | A1* | 8/2012 | Lakshmanan | G06Q 10/10 |
| | | | | 709/206 |
| 2013/0058473 | A1 | 3/2013 | de Jong | |
| 2013/0263020 | A1 | 10/2013 | Heiferman et al. | |
| 2014/0040374 | A1 | 2/2014 | Olsen et al. | |
| 2014/0082100 | A1* | 3/2014 | Sammon | G06Q 10/101 |
| | | | | 709/206 |
| 2015/0058324 | A1* | 2/2015 | Kauwe | G06Q 50/01 |
| | | | | 707/722 |
| 2016/0275458 | A1* | 9/2016 | Meushar | G06Q 10/109 |

OTHER PUBLICATIONS

"Introduction to the Cisco WebEx Social API", Cisco WebEx Social API Reference Guide, pp. 1-10, downloaded on Oct. 3, 2014, <http://www.cisco.com/en/US/docs/collaboration/ecp/api/3_0/ref_guide/overview.html>.

* cited by examiner

300

Resume - John Doe

Personal Statement

This is what I am striving to do with my career. — 302

My most significant accomplishments are X and Y. — 304

Work Experience

Oct 2010 - Present, Software Group, Inc.

- 2013 Led Development of Super-duper workflow manager — 306
- 2012 Promoted to Senior Architect — 308

Jan. 2006 - Sept 2010, Some Such Software, Inc.

- 2009 Named official corporate champion of Some Such Agile Development Process — 310
- 2008 Successfully led development of Some Such Accounting Package — 312

Education

M. S. Astrology, Starlight University, 1990
B. A. General Studies, No Such University, 1988

FIG. 3A

| Fragment [Default Order top -> bottom] | Relevance for audience that user knows well | Relevance for technical audience | | Relevance for group of superiors | |
|---|---|---|---|---|---|
| This is what I am striving to do with my career. | 0 | 0 | | 0 | |
| My most significant accomplishments are X and Y. | 7 | A | 8 | C | 8 | A |
| 2013 Led Development of Super-duper workflow manager | 6 | B | 9 | A | 7 | C |
| 2012 Promoted to Senior Architect | 5 | C | 9 | B | 8 | B |
| 2009 Named official corporate champion of Some Such Agile Development Process | 2 | D | 7 | D | 5 | |
| 2008 Successfully led development of Some Such Accounting Package | 1 | | 5 | | 5 | D |

GREETING AGENT FOR MEETING INTRODUCTIONS

BACKGROUND OF THE INVENTION

The present invention relates generally to the field of computer-assisted conferencing and teleconferencing, and more particularly to providing a greeting agent for meeting introductions.

Meetings may be considered one of the most important activities in a business environment. Many organizations hold regular meetings as part of their routine operations. Delivering information, keeping colleagues and customers updated, discussing issues around team projects, assigning tasks, tracking progress, and making decisions are some of the reasons that meetings are an important part of professional activity. Meetings may be held in a variety of manners, including, but not limited to, in person, via teleconference, or via web conference.

In some meetings, there is a period at the beginning of the meeting when participants introduce themselves. Participants often find introductions useful for understanding a little about the other participants. Participants may describe educational background, a role on a particular project, or a role within an organization. Participant introductions enable participants to understand expertise or seniority of participants in the meeting, as well as determining with whom a participant has a common interest.

SUMMARY

Embodiments of the present invention disclose a method, a computer program product, and a computer system for determining an introduction of a user in a meeting. A first aspect of the present invention discloses a method for determining an introduction of a user in a meeting. One or more computer processors retrieve a document containing information associated with a user, wherein the document includes one or more fragments describing the user. The one or more computer processors determine an audience of a meeting associated with the user. The one or more computer processors determine a description of the meeting. The one or more computer processors prioritize one or more of the one or more fragments, based, at least in part, on the audience of the meeting and on the description of the meeting. The one or more computer processors select one or more of the one or more fragments for the introduction of the user in the meeting, based, at least in part, on the prioritization of the one or more fragments.

A second aspect of the present invention discloses a computer program product for determining an introduction of a user in a meeting. The computer program product includes a computer readable storage medium having program instructions embodied therewith, the program instructions executable by one or more computer processors to cause the one or more computer processors to retrieve a document containing information associated with a user, wherein the document includes one or more fragments describing the user. The one or more computer processors determine an audience of a meeting associated with the user. The one or more computer processors determine a description of the meeting. The one or more computer processors prioritize one or more of the one or more fragments, based, at least in part, on the audience of the meeting and on the description of the meeting. The one or more computer processors select one or more of the one or more fragments for the introduction of the user in the meeting, based, at least in part, on the prioritization of the one or more fragments.

A third aspect of the present invention discloses a computer system for determining an introduction of a user in a meeting, the computer system comprising one or more computer processors and/or one or more computer readable storage media, wherein the program instructions are stored on the one or more computer readable storage media for execution by at least one of the one or more computer processors. The program instructions comprise retrieving a document containing information associated with a user, wherein the document includes one or more fragments describing the user. The program instructions comprise determining an audience of a meeting associated with the user. The program instructions comprise determining a description of the meeting. The program instructions comprise prioritizing one or more of the one or more fragments, based, at least in part, on the audience of the meeting and on the description of the meeting. The program instructions comprise selecting at least one of the one or more fragments for the introduction of the user in the meeting, based, at least in part, on the prioritization of the one or more fragments.

BRIEF DESCRIPTION OF THE SEVERAL VIEWS OF THE DRAWINGS

FIG. 3A illustrates an example of a resume used by the greeting agent program, in accordance with an embodiment of the present invention;

FIG. 3B illustrates an example of prioritization and selection of fragments of the resume performed by the greeting agent program, in accordance with an embodiment of the present invention.

DETAILED DESCRIPTION OF THE PREFERRED EMBODIMENTS

During an introduction period of a meeting, whether the meeting is in person, a teleconference, or a web meeting, a participant may be nervous about preparing a greeting. Preoccupation with a greeting preparation can cause the participant to miss introductions by other participants. Even if a participant hears the other introductions, remembering the descriptions of other participants may be difficult. If participants take a lot of time with the introduction due to being unprepared or reciting irrelevant information due to not knowing the audience, introductions can take time away from the meeting.

Figure 1:
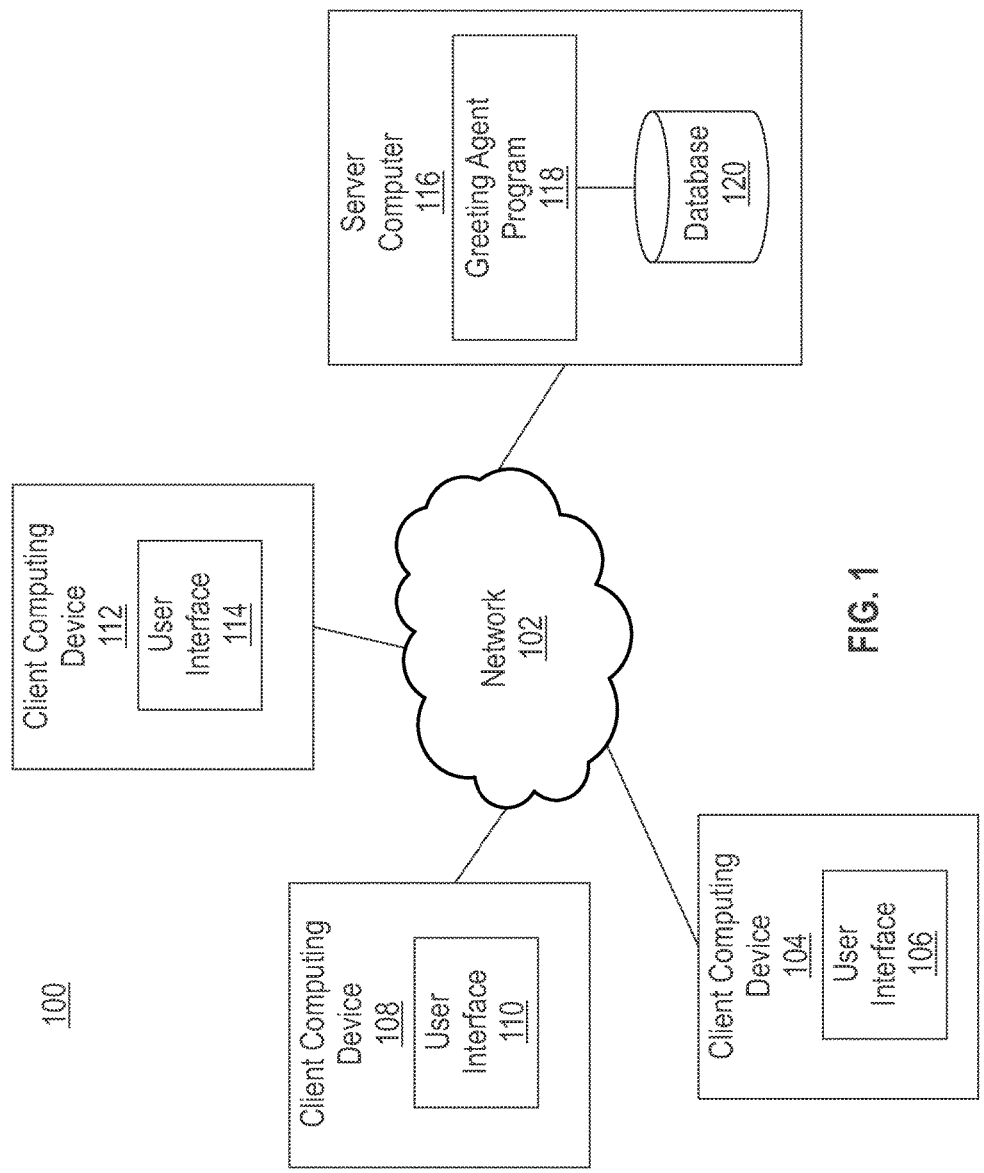
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing devices 104, 108, and 112 and server computer 116, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information.

Client computing devices 104, 108, and 112 can each be a desktop computer, a laptop computer, a tablet computer, a specialized computer server, a smartphone, or any programmable electronic device capable of communicating with server computer 116 via network 102 and with various components and devices within distributed data processing environment 100. Client computing devices 104, 108, and 112 can each be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. In general, client computing devices 104, 108, and 112 represent any programmable electronic device or combination of programmable electronic devices capable of executing machine readable program instructions and communicating with other computing devices via a network, such as network 102. Client computing devices 104, 108, and 112 include, respectively, user interfaces 106, 110, and 114.

User interfaces 106, 110, and 114 each provides an interface between a user of client computing devices 104, 108, and 112, respectively, and server computer 116. User interfaces 106, 110, and 114 each may be a graphical user interface (GUI) or a web user interface (WUI) and can display text, documents, web browser windows, user options, application interfaces, and instructions for operation. Additionally, user interfaces 106, 110, and 114 include the information (such as graphic, text, and sound) that a program presents to a user and the control sequences the user employs to control the program. User interfaces 106, 110, and 114 may also be mobile application software that provides an interface between a user of client computing devices 104, 108, and 112, respectively, and server computer 116. Mobile application software, or an "app", is a computer program designed to run on smart phones, tablet computers and other mobile devices. User interfaces 106, 110, and 114 enable a user of client computing devices 104, 108, and 112, respectively, to interact with server computer 116 via network 102 for the preparation of a participant introduction or greeting.

Server computer 116 can be a management server, a web server, or any other electronic device or computing system capable of receiving and sending data. In other embodiments, server computer 116 can represent a server computing system utilizing multiple computers as a server system, such as in a cloud computing environment. In another embodiment, server computer 116 can be a laptop computer, a tablet computer, a netbook computer, a personal computer (PC), a desktop computer, a personal digital assistant (PDA), a smartphone, or any programmable electronic device capable of communicating with client computing devices 104, 108, and 112 via network 102. In another embodiment, server computer 116 represents a computing system utilizing clustered computers and components to act as a single pool of seamless resources. Server computer 116 includes greeting agent program 118 and database 120.

Greeting agent program 118 resides on a server computer 116. In another embodiment, greeting agent program 118 may reside on a client computing device, such as client computing devices 104, 108, and 112. Greeting agent program 118 prepares participant introductions for individuals to use in meetings. In one embodiment, an individual participant initiates greeting agent program 118, via user interface 106, 110, or 114, either prior to the meeting or at the time during the meeting that the user is asked to give an introduction. In another embodiment, the meeting host initiates greeting agent program 118, via user interface 106, 110, or 114, for all of the participants, either prior to the meeting or at the beginning of the meeting. In a further embodiment, where greeting agent program 118 is integrated into a user's calendaring system, greeting agent program 118 may automatically prepare an introduction once a meeting invitation is accepted. Greeting agent program 118 retrieves a document containing information associated with a user, such as a user-prepared resume or profile document that describes the user's experience and interests. Greeting agent program 118 analyzes a meeting participant list and a meeting title or description to determine an audience and subject matter of the meeting. In one embodiment, greeting agent program 118 prioritizes fragments of the user's resume based on the meeting participants and a description of the meeting. A resume fragment may be a sentence, phrase, or blurb that describes a user or the user's background or experience in some way. A fragment may contain information regarding a user's educational background, a career highlight, a history of professional positions, a key project, a role within a project, a publication, a patent, a personal highlight, a technical proficiency, an interest, or a hobby. Greeting agent program 118 estimates an amount of time allotted in the meeting to each participant for introductions. In one embodiment, based on the allotted amount of time, greeting agent program 118 selects the fragments of the user's resume to include in the introduction. In other embodiments, greeting agent program 118 may select the fragments of the user's resume to include in the introduction based on other variables, such as information the user would like people to know. Greeting agent program 118 provides the introduction during the meeting. If the user approves, greeting agent program 118 also sends the additional information from the resume that was not included in the prioritized selection used for the introduction to the other participants in the meeting. Greeting agent program 118 is depicted and described in further detail with respect to FIG. 2.

Database 120 resides on server computer 116. In another embodiment, database 120 can reside elsewhere in the environment, for example, distributed among client computing devices 104, 108, or 112. A database is an organized collection of data. Database 120 can be implemented with any type of storage device capable of storing data that can be accessed and utilized by client computing devices 104, 108, and 112 and server computer 116, such as a database server, a hard disk drive, or a flash memory. In other embodiments, database 120 can represent multiple storage devices within distributed data processing environment 100 or within server computer 116. In various embodiments, database 120 may represent zero to many databases. Database 120 stores resumes and/or profile documents for users of greeting agent program 118. Database 120 also stores the introductions that result from greeting agent program 118 selecting appropriate resume fragments. Database 120 may also store meeting descriptions and distribution lists of meeting invitees or participants. Database 120 may also store a company or organization directory of employees.

Figure 2:
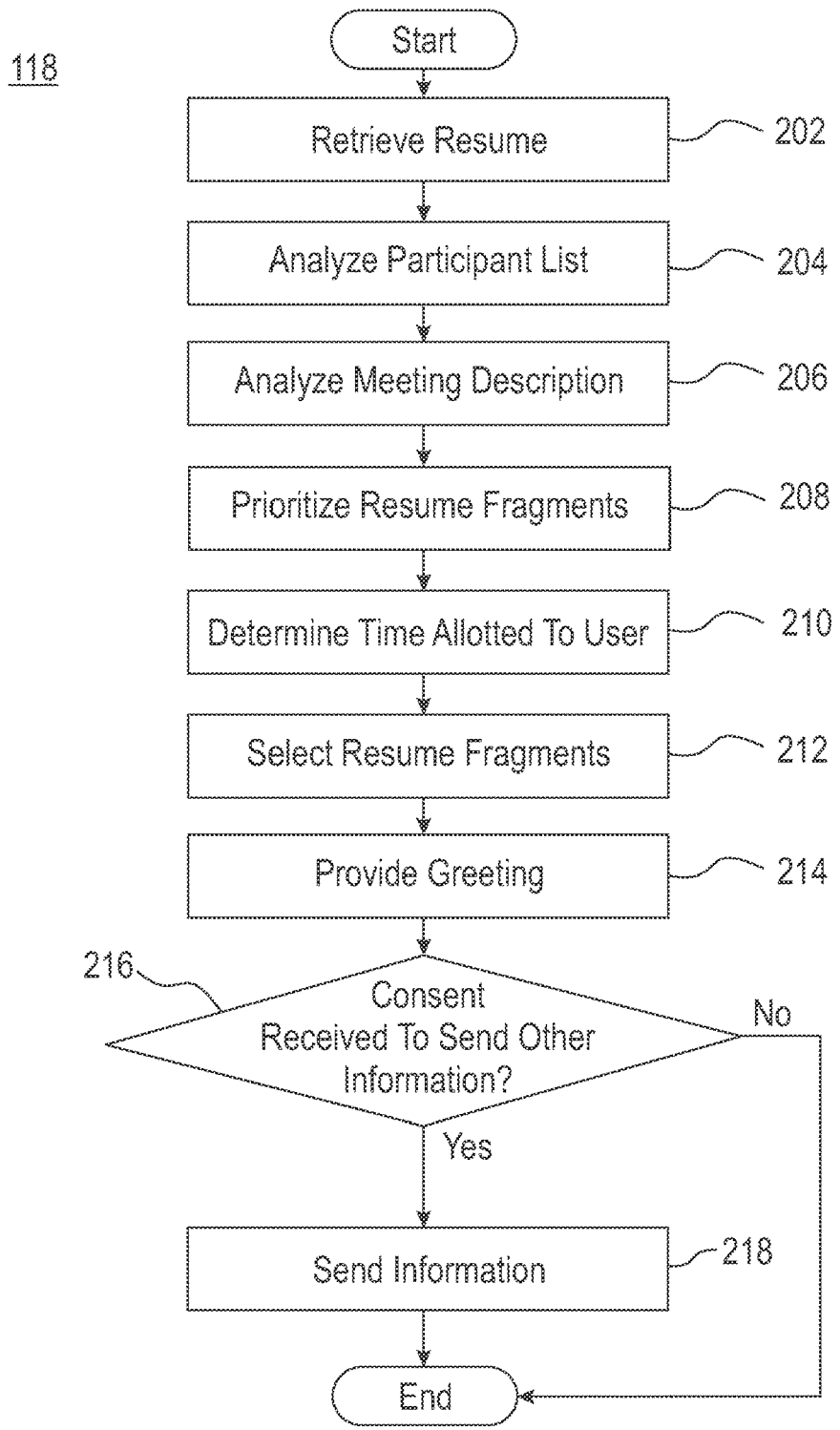
FIG. 2 is a flowchart depicting operational steps of a greeting agent program, in accordance with an embodiment of the present invention.

FIG. 2 is a flowchart depicting operational steps of greeting agent program 118, for preparing a meeting introduction, in accordance with an embodiment of the present invention.

Greeting agent program 118 retrieves a resume (step 202). Prior to a meeting, a participant prepares and stores a document containing information associated with the participant, such as a resume or profile document, that describes the participant's background and expertise in database 120. The resume or profile document may include the participant's educational background, as well as career and personal achievements. Greeting agent program 118 retrieves the resume or profile document from database 120. In one embodiment, greeting agent program 118 retrieves a text version of the resume. In another embodiment, greeting agent program 118 retrieves an audio version of the resume that the participant recorded and stored in database 120. In another embodiment, where the participant has not stored a resume in database 120, greeting agent program 118 retrieves information about the participant from another source. For example, greeting agent program 118 may retrieve information about the participant from an employee directory. In another example, greeting agent program 118 may retrieve information about the participant by searching the Web and querying social networks, via network 102. In a further embodiment, where the participant has not stored a resume in database 120, greeting agent program 118 may prompt the user to upload a resume or profile document to database 120.

Greeting agent program 118 analyzes a participant list (step 204). When a user receives a meeting invitation, the invitation typically includes a list of other invitees. Greeting agent program 118 analyzes the participant list in order to determine which fragments of the user's resume are relevant to other meeting participants. In one embodiment, prior to a meeting, greeting agent program 118 analyzes an invitee list of a meeting invitation. In another embodiment, greeting agent program 118 may analyze a list of speakers on an agenda of the meeting. In another embodiment, a user or meeting host deploys greeting agent program 118 just as the meeting begins such that greeting agent program 118 can determine actual participation in the meeting by analyzing the participant list. For example, in a web meeting, greeting agent program 118 can analyze the list of participants displayed on the screen of the user's client computing device, such as client computing device 104. Greeting agent program 118 analyzes the participant list to determine any connections between the user and the other participants. For example, greeting agent program 118 may determine what fraction of participants are from the same company as the user. In another example, greeting agent program 118 may determine a fraction of participants that already know the user by analyzing an employee directory or the user's email. In a further example, greeting agent program 118 may determine the technical proficiencies of the participants by noting participants' titles or other descriptive information found in an employee directory or in a meeting agenda.

Greeting agent program 118 analyzes a meeting description (step 206). Greeting agent program 118 analyzes the meeting description or agenda in order to determine which fragments of the user's resume are relevant to the topic of the meeting. Greeting agent program 118 may use keyword proximity methods from natural language processing, such as centroid or vector cosine methods, as are known in the art, comparing the bag-of-words representing the meeting description to the bag-of-words representing the user's various resume fragments. For example, if the meeting is a project meeting, greeting agent program 118 may determine whether the user's project history is relevant. In another example, if the meeting is an introductory meeting, greeting agent program 118 may determine whether the user's high level overview information is relevant. In a further example, if the meeting is a brainstorming meeting, greeting agent program 118 may determine whether the user's recent patent and publication history is relevant.

Greeting agent program 118 prioritizes resume fragments (step 208). Greeting agent program 118 prioritizes fragments of the user's resume based on the analyses of the participant list and the meeting description. In one embodiment, greeting agent program 118 prioritizes the resume fragments based on a pre-defined set of rules. A pre-defined set of rules may be stored in database 120 by a software developer, a user, greeting agent program 118, or any other program that has access to database 120. For example, if, by analysis of the participant list, greeting agent program 118 determines a pre-defined percentage of the participants are from another company or are unknown to the user, then greeting agent program 118 may prioritize the higher level portions of the resume. In another example, if greeting agent program 118 determines a pre-defined percentage of the participants are highly technical, then greeting agent program 118 may prioritize the technical details of the resume. In a further example, if greeting agent program 118 determines a pre-defined percentage of the participants are at a higher level of the employee hierarchy than the user, i.e. superiors, then greeting agent program 118 may prioritize the more detailed, project-oriented fragments of the resume. In another embodiment, greeting agent program 118 can assess the constituency of the meeting participants to fall into more than one category. For example, greeting agent program 118 may determine that 25% of the meeting participants are highly technical, 50% of the meeting participants are somewhat technical, and 25% of the meeting participants are not technical. In the example, greeting agent program 118 can rank or order the resume fragments proportionally according to the appropriateness or importance of each fragment to each portion of the audience. In a further embodiment, greeting agent program 118 may display a popup box to the user with a list of resume fragments and associated checkboxes, via user interface 106, 110, or 114, such that the user can choose the prioritization of the fragments of the resume, or alternatively, list recommended resume fragments and allow the user to confirm or reject the recommendations via an analogous user interface mechanism.

Greeting agent program 118 determines the time allotted to the user (step 210). Greeting agent program 118 estimates the time allotted to the user in the meeting in order to select the appropriate amount of information from the user's resume to fill, but not exceed, the time allotted. In one embodiment, greeting agent program 118 analyzes both the meeting agenda, to determine the amount of time on the agenda for introductions, and the participant list, to determine the number of meeting participants, to divide the introduction time equally between all participants. In another embodiment, where the meeting host deploys greeting agent program 118, the meeting host may assign an allotted time to each participant. In a further embodiment, if other participants' introductions occur before the user's introduction, greeting agent program 118 can factor in the length of previous introductions to determine and/or adjust the time allotted to the user's introduction.

Greeting agent program 118 selects resume fragments (step 212). Based on the prioritization and the time allotted to the user, greeting agent program 118 selects the resume fragments to use for the introduction. For example, if little time is allotted, or if the majority of the meeting participants know the user's background, greeting agent program 118 selects one or two summary or representative fragments or sentences from the resume to include in the introduction. In one embodiment, greeting agent program 118 provides a preview of the introduction to the user, via user interface 106, 110, or 114, to allow the user to approve or change the introduction prior to greeting agent program 118 providing the introduction at the meeting.

Greeting agent program 118 provides a greeting (step 214). In one embodiment, at the moment in the meeting when the meeting host requests the user's introduction, greeting agent program 118 provides the greeting for the user. In an embodiment where the meeting host deploys greeting agent program 118, greeting agent program 118 may provide the greetings for all of the participants. In one embodiment, greeting agent program 118 plays a pre-recorded version of the greeting in the user's voice. In another embodiment, greeting agent program 118 uses automated text-to-speech technology, known in the art, to read the greeting. In a further embodiment, greeting agent program 118 provides the introduction by sending the introduction to the user, displaying the introduction on a screen of the user's client computing device, such as client computing device 104, 108, or 112, via user interface 106, 110, or 114, and letting the user read the introduction. In another embodiment, greeting agent program 118 provides the introduction by sending the introduction to the participants and displaying the introduction on a screen of a participant's client computing device, such as client computing device 104, 108, or 112, via user interface 106, 110, or 114

Greeting agent program 118 determines whether consent is received to send other information (decision block 216). If the selection of resume fragments did not include all of the information in the user's resume, then greeting agent program 118 determines whether the user wants to share the other information with the meeting participants. In one embodiment, greeting agent program 118 displays a popup box, via user interface 106, 110, or 114, asking the user for consent to send other information. If greeting agent program 118 determines consent is received to send other information ("yes" branch, decision block 216), then greeting agent program 118 sends the information (step 218). Depending on the connectivity of the other participants, greeting agent program 118 may send the additional resume information via email, chat, text, telephony, etc., via network 102. In one embodiment, greeting agent program 118 sends the entire resume. In another embodiment, greeting agent program 118 sends only the top priority items, as determined by a pre-defined rule. In one embodiment, greeting agent program 118 provides a link or access to the user's resume in database 120. In an embodiment where no time is allotted for introductions, greeting agent program 118 may send all or part of the resume to all participants for viewing during the meeting.

If greeting agent program 118 determines consent is not received to send other information ("no" branch, decision block 216), then greeting agent program 118 ends.

FIG. 3A illustrates an example of a resume used by greeting agent program 118, in accordance with an embodiment of the present invention.

Resume 300 is a sample resume that includes a plurality of fragments. Greeting agent program 118 retrieves resume 300 from database 120. In the example, several fragments of resume 300 are highlighted. Fragments 302 and 304 fall under the heading of "Personal Statement". Fragments 306 and 308 fall under one job description under the heading of "Work Experience". Fragments 310 and 312 fall under a second job description under the heading of "Work Experience".

FIG. 3B illustrates an example of the prioritization and selection of fragments of resume 300, depicted in FIG. 3A, performed by greeting agent program 118, in accordance with an embodiment of the present invention.

As discussed earlier with respect to step 208 of FIG. 2, greeting agent program 118 prioritizes resume fragments based on analysis of the meeting audience and the meeting description. Table 350 illustrates the prioritization of the fragments highlighted in resume 300 in FIG. 3A. Categories 314 describe the categories listed in the columns of table 350. Categories 314 includes "Fragment" which lists the fragments of resume 300 in the order in which the fragments appear in resume 300. Categories 314 also includes three columns that describe the relevance of the fragments to particular audiences of meeting participants. Fragments 302 through 312, as shown in FIG. 3A, are duplicated in the first column, labelled "Fragment", of table 350 in FIG. 3B. Greeting agent program 118 prioritizes the resume fragments based on the analysis of the participants. In one embodiment, the prioritization is a numerical ranking. The prioritization for each of the three audiences is shown with a numerical ranking in columns 316, 318, and 320, respectively. For example, column 316 depicts fragment 304 as having a high relevance for an audience of meeting participants that the user knows well. In one embodiment, based on the allotted time for greetings for each participant in the meeting, greeting agent program 118 selects which resume fragments to include in the introduction. In many meetings, the time allotted to introductions does not allow greeting agent program 118 to include all resume fragments in the introduction. The selection of resume fragments to include in the introduction for each of the three audiences is shown with an alphabetical ordering in columns 322, 324, and 326, respectively. In the example, the three meetings have the same time allotted to introductions, and each selection column includes only four of the six fragments due to a time limitation. As depicted, for an audience that the user knows well, fragments 304, 306, 308, and 310 are high priority and selected for the greeting.

Figure 4:
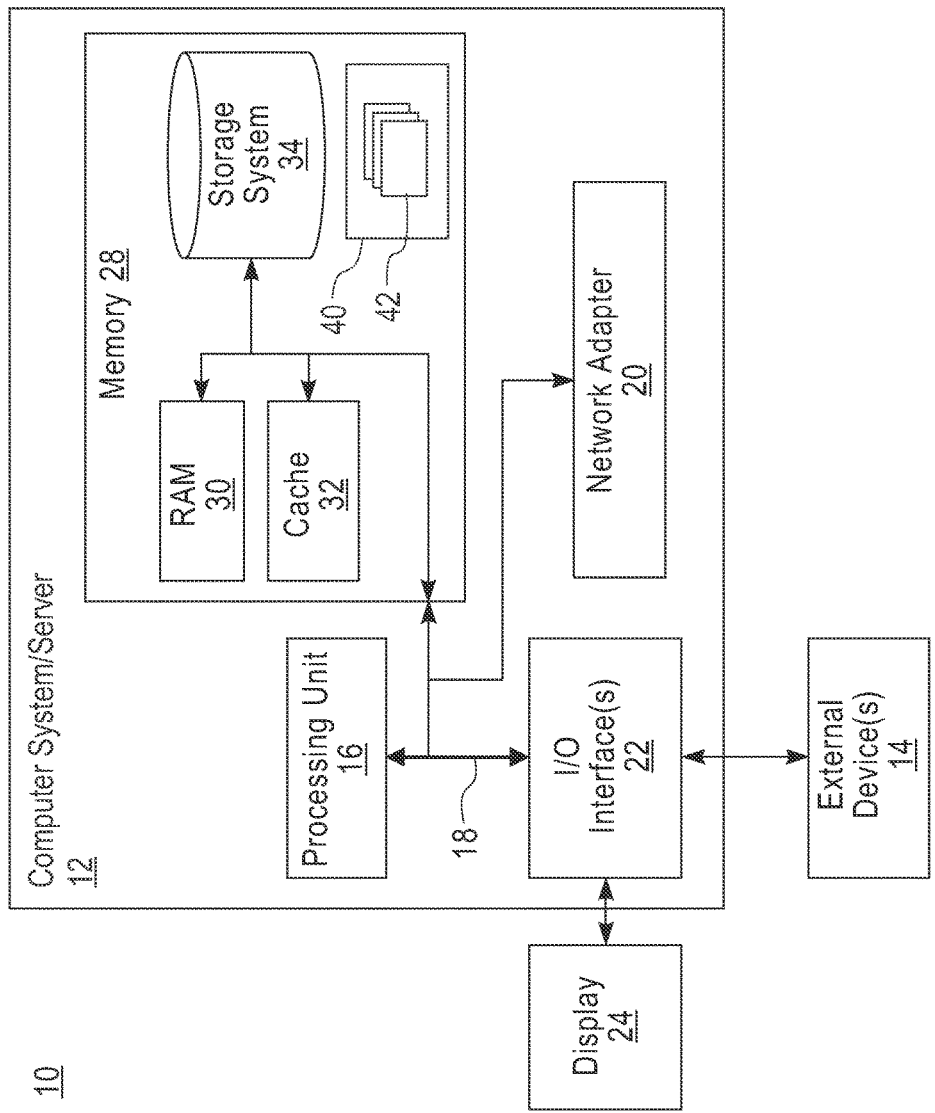
FIG. 4 depicts a schematic of an example of a cloud computing node, in accordance with an embodiment of the present invention.

FIG. 4 depicts a schematic of an example of a cloud computing node. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In an embodiment of the present invention, computer system/server 12 may be representative of server computer 116 in distributed data processing environment 100. In another embodiment, server computer 116 may include the hardware components of computer system/server 12 in a networked environment and not in a cloud computing environment.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
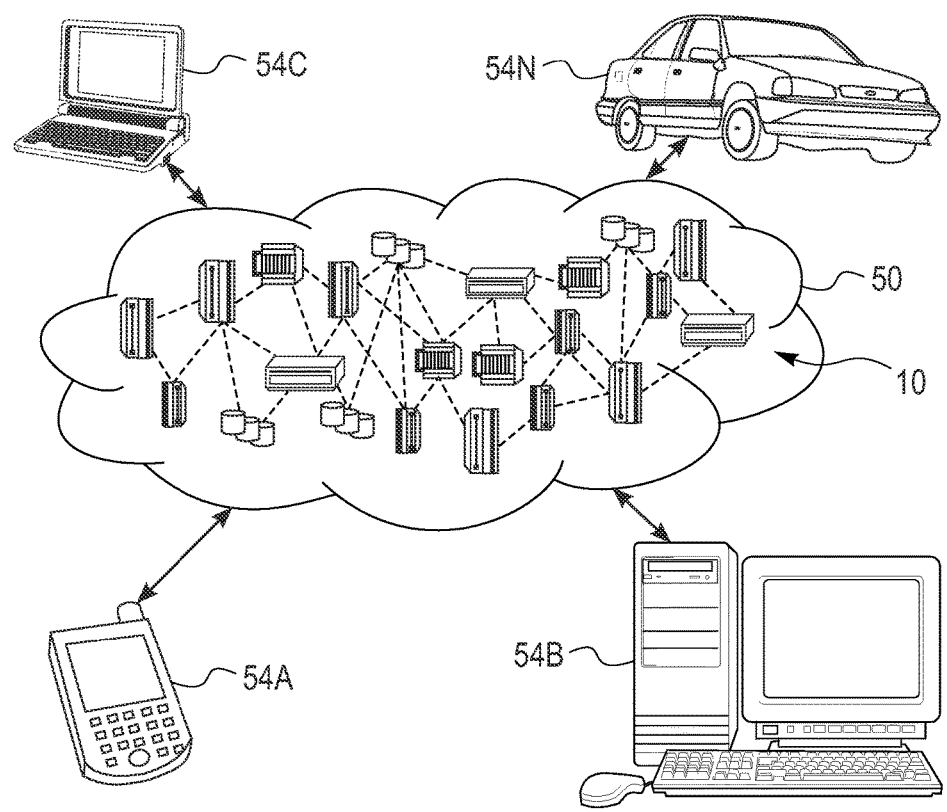
FIG. 5 depicts an illustrative cloud computing environment, in accordance with an embodiment of the present invention.

FIG. 5 depicts illustrative cloud computing environment 50, in accordance with an embodiment of the present invention. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 6:
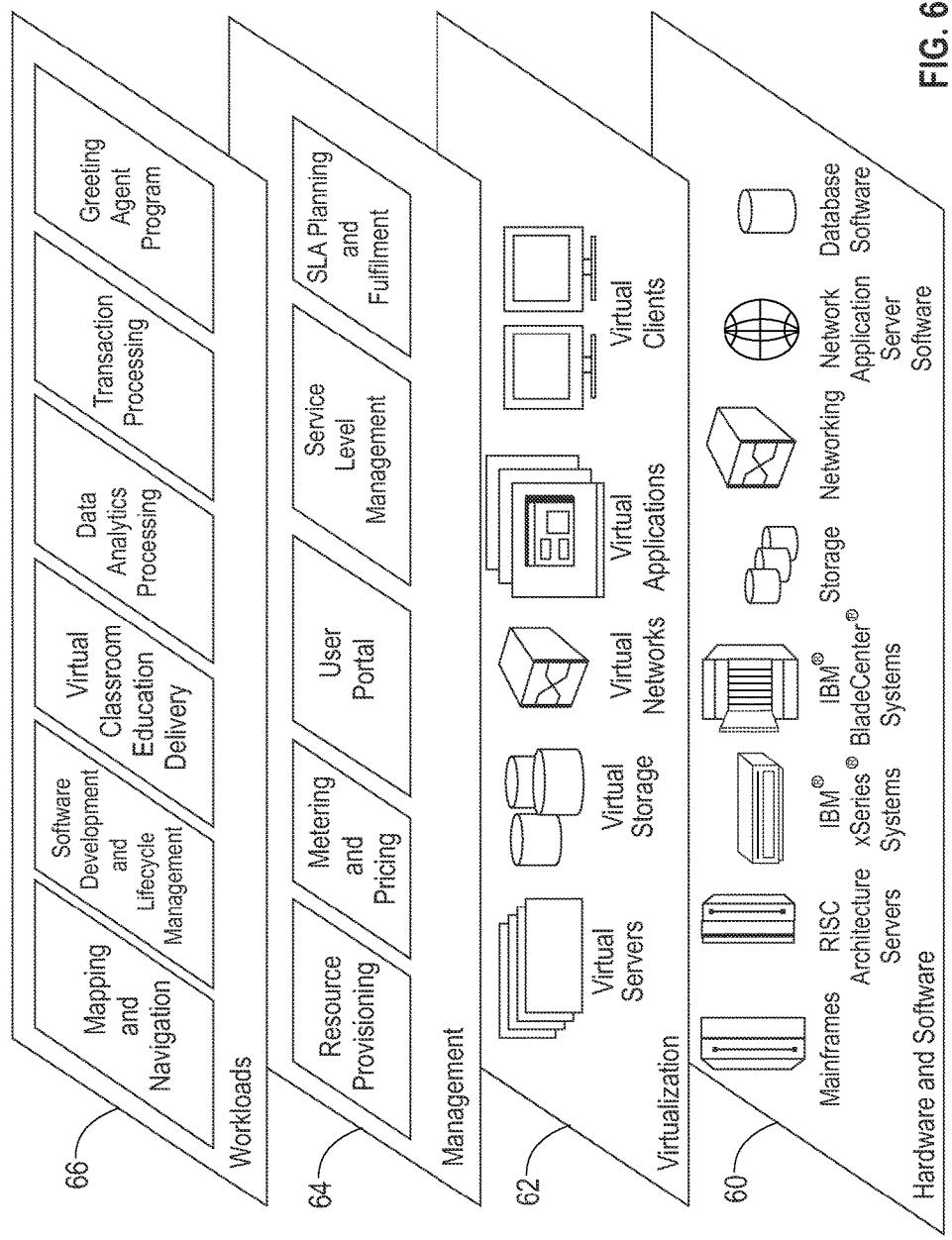
FIG. 6 depicts a set of functional abstraction layers provided by a cloud computing environment, in accordance with an embodiment of the present invention.

FIG. 6 depicts a set of functional abstraction layers provided by cloud computing environment 50, in accordance with an embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and greeting agent program.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, the method comprising:
   determining, by one or more computer processors, a meeting participant joins a meeting;
   retrieving, by the one or more computer processors, a document containing information associated with the meeting participant;
   identifying, by the one or more computer processors, one or more fragments of the document, wherein the one or more fragments describe an experience of the meeting participant;
   determining, by the one or more computer processors, an audience of the meeting, wherein the meeting includes at least one of an in person meeting, a teleconference, or a web meeting;
   determining, by the one or more computer processors, a subject matter of the meeting;
   prioritizing, by the one or more computer processors, one or more of the one or more fragments, based, at least in part, on the audience of the meeting and on the subject matter of the meeting;
   selecting, by the one or more computer processors, at least one of the one or more fragments for the introduction of the meeting participant in the meeting, based, at least in part, on the prioritization of the one or more fragments; and
   providing, by the one or more computer processors, an introduction of the meeting participant to one or more additional meeting participants of the meeting, wherein the introduction is comprised of the at least one of the one or more selected fragments.

2. The method of claim 1, wherein providing the introduction of the meeting participant includes at least one of: playing a pre-recorded version of the at least one selected fragments, reading the at least one selected fragments via automated text-to-speech technology, sending the at least one selected fragments to the meeting participant, and sending the at least one selected fragments to the one or more additional meeting participants of the meeting.

3. The method of claim 1, further comprising:
   responsive to providing the introduction of the meeting participant, determining, by the one or more computer processors, whether the meeting participant consents to sending one or more additional fragments to the one or more additional meeting participants; and
   responsive to determining the meeting participant consents to sending one or more additional fragments to the one or more additional meeting participants, sending, by the one or more computer processors, one or more additional fragments.

4. The method of claim 1, wherein retrieving the document containing information associated with the meeting participant further comprises retrieving, by the one or more computer processors, one or more descriptions of the user from one or more of a resume, a profile document, an employee directory, an organization directory, and a social network.

5. The method of claim 1, wherein the one or more fragments describing the experience of the meeting participant include a description of at least one of: a career highlight, a history of professional positions, a key project, a role within a project, a publication, a patent, a personal highlight, a technical proficiency, an interest, and a hobby.

6. The method of claim 1, wherein determining the audience of the meeting further comprises analyzing, by the one or more computer processors, at least one of a meeting invitee list, a meeting participant list, and a list of speakers on a meeting agenda.

7. The method of claim 1, wherein the subject matter of the meeting includes one or more of a meeting title, a list of participants, a list of speakers, and a meeting agenda.

8. The method of claim 1, wherein determining the subject matter of the meeting further comprises analyzing, by the one or more computer processors, at least one of a meeting invitation, a meeting title, and a meeting agenda.

9. The method of claim 1, further comprising:
   responsive to prioritizing one or more of the one or more fragments, determining, by the one or more computer processors, a time allotted to an introduction of the meeting participant in the meeting; and
   selecting, by the one or more computer processors, at least one of the one or more fragments for the introduction of the meeting participant in the meeting, based, at least in part, on the prioritization of the one or more fragments and the time allotted to the introduction.

10. The method of claim 9, wherein determining the time allotted to the introduction of the meeting participant in the meeting further comprises:
    determining, by the one or more computer processors, a number of participants in the meeting;
    determining, by the one or more computer processors, a length of time allotted to introductions of all participants in the meeting; and
    estimating, by the one or more computer processors, based, at least in part, on the number of participants in the meeting and the length of time allotted to introductions of all participants in the meeting, a length of time allotted to the introduction of one meeting participant.

11. A computer program product, the computer program product comprising a computer readable storage medium having program instructions embodied therewith, the program instructions executable by one or more computer processors to cause the one or more computer processors to:
    determine, by the one or more computer processors, a meeting participant joins a meeting;
    retrieve, by the one or more computer processors, a document containing information associated with a meeting participant;
    identify, by the one or more computer processors, one or more fragments of the document, wherein the one or more fragments describe an experience of the meeting participant;
    determine, by the one or more computer processors, an audience of the meeting, wherein the meeting includes at least one of an in person meeting, a teleconference, or a web meeting;

determine, by the one or more computer processors, a subject matter of the meeting;

prioritize, by the one or more computer processors, one or more of the one or more fragments, based, at least in part, on the audience of the meeting and on the subject matter of the meeting;

select, by the one or more computer processors, at least one of the one or more fragments for the introduction of the meeting participant in the meeting, based, at least in part, on the prioritization of the one or more fragments; and provide, by the one or more computer processors, an introduction of the meeting participant to one or more additional meeting participants of the meeting, wherein the introduction is comprised of the at least one of the one or more selected fragments.

12. The computer program product of claim 11, wherein program instructions to retrieve the document containing information associated with the meeting participant further comprises program instructions to retrieve one or more descriptions of the user from one or more of a resume, a profile document, an employee directory, an organization directory, and a social network.

13. The computer program product of claim 11, wherein program instructions to determine the audience of the meeting further comprises program instructions to analyze at least one of a meeting invitee list, a meeting participant list, and a list of speakers on a meeting agenda.

14. The computer program product of claim 11, wherein program instructions to determine the subject matter of the meeting further comprises program instructions to analyze at least one of a meeting invitation, a meeting title, and a meeting agenda.

15. A computer system for determining an introduction of a user in a meeting, the computer system comprising:
one or more computer processors;
one or more computer readable storage media;
program instructions stored on the one or more computer readable storage media for execution by at least one of the one or more computer processors, the program instructions comprising:

program instructions to determine a meeting participant joins a meeting;

program instructions to retrieve a document containing information associated with a user the meeting participant, wherein the document is a resume, and wherein the document includes one or more fragments describing an experience of the user;

program instructions to identify one or more fragments of the document, wherein the one or more fragments describe an experience of the meeting participant;

program instructions to determine an audience of the meeting, wherein the meeting includes at least one of an in person meeting, a teleconference, or a web meeting;

program instructions to determine a subject matter of the meeting;

program instructions to prioritize one or more of the one or more fragments, based, at least in part, on the audience of the meeting and on the subject matter of the meeting; and program instructions to select at least one of the one or more fragments for the introduction of the meeting participant in the meeting, based, at least in part, on the prioritization of the one or more fragments; and program instructions to provide an introduction of the meeting participant to one or more additional meeting participants of the meeting, wherein the introduction is comprised of the at least one of the one or more selected fragments.

16. The computer system of claim 15, wherein program instructions to retrieve the document containing information associated with the user further comprises program instructions to retrieve one or more descriptions of the meeting participant from one or more of a resume, a profile document, an employee directory, an organization directory, and a social network.

17. The computer system of claim 15, wherein program instructions to determine the audience of the meeting further comprises program instructions to analyze at least one of a meeting invitee list, a meeting participant list, and a list of speakers on a meeting agenda.

* * * * *